United States Patent [19]
O'Meara

[11] 3,727,223
[45] Apr. 10, 1973

[54] ADAPTIVE POWER REDISTRIBUTION SYSTEMS

[75] Inventor: Thomas R. O'Meara, Malibu, Calif.

[73] Assignee: Hughes Aircraft Company, Culver City, Calif.

[22] Filed: Feb. 24, 1972

[21] Appl. No.: 128,629

[52] U.S. Cl. ............343/7.5, 250/199, 343/100 TD
[51] Int. Cl. .............................G01s 7/42, G01s 9/62
[58] Field of Search .....................250/199; 325/154, 325/159, 180; 343/7.5, 100 SA, 100 TD

[56] References Cited

UNITED STATES PATENTS 2,896,073   7/1959   Westphal.............................325/159
3,453,559   7/1969   Sharp et al........................250/199 X Primary Examiner—Stephen C. Bentley
Attorney—W. H. MacAllister, Jr. and Lawrence V. Link, Jr.

[57] ABSTRACT

Herein are disclosed multiple path power transmission systems having monitoring and control subsystems associated with each path for separately sensing the efficiency thereof, and for redistributing the power among the paths in such a manner as to maximize the overall efficiency. Phase modulation at different frequencies or differing waveforms is applied in each transmission path; and modulation components in the received energy, indicative of the efficiency of the individual paths, are used to control the relative gain of the transmitting channels.

21 Claims, 5 Drawing Figures

Thomas R. O'Meara,
INVENTOR.

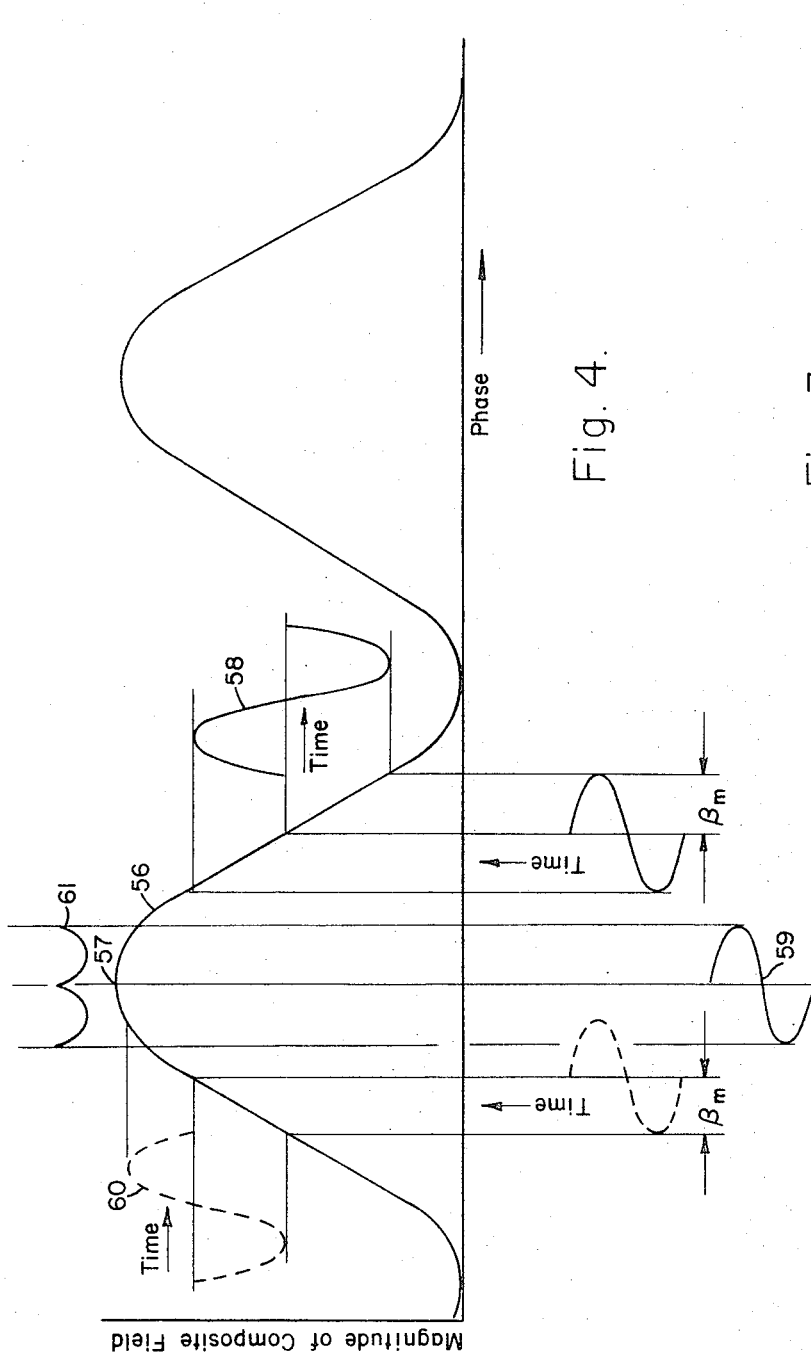
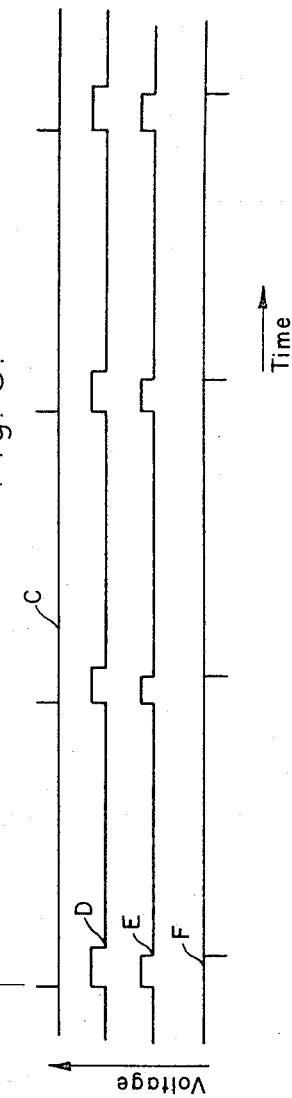

the invention itself, will be better understood from the ac-

ADAPTIVE POWER REDISTRIBUTION SYSTEMS

The invention claimed herein was made in the course of or under a contract or subcontract thereunder, with the United States Air Force.

BACKGROUND OF THE INVENTION

This invention relates generally to devices for optimizing power transmission in multiple path systems; and is particularly adapted to applications wherein the transmitted power is at microwave or optical frequencies, and the parallel paths are established by an ensemble of radiating apertures, such as in phased arrays.

In many multiple path power transmission systems such as those involving the radiation of electromagnetic energy from a plurality of separate apertures forming a phased transmission array, it is important that the power transfer take place with the highest possible efficiency. The efficiency of this type of power transmission is especially important in high power airborne applications, for example. Failure or degradation of one or more transmission paths may result from a wide variety of causes, such as equipment failures, path attenuations, or direction pointing errors (boresight or angle tracking). Also these defects, such as those resulting from atmospheric turbulence, may be time varying. Hence it is desirable to be able to continually measure the efficiency of the separate transmission paths and to either establish corrective measures in weak paths or to redistribute the power among the paths in such a manner as to maximize overall system efficiency.

One approach for monitoring the separate paths of a multiple path transmission system is to employ test signals at discrete separate frequencies to measure the efficiency of each of the paths. This "separate test signal" approach is expensive and where long transmission paths are involved, the test signals must be transmitted at high power levels to achieve sufficient signal-to-noise ratios at the receiving (monitoring) point. Also if the separate test signals are not near the power signal in frequency they may not accurately reflect the transmission problems being experienced; but if they are too near the power signal in frequency mutual interference problems may be encountered.

SUMMARY OF THE INVENTION

It is therefore an object of the subject invention to provide new and novel systems for monitoring the efficiency of each transmission path of multiple path power transmission systems.

Another object is to provide a system for monitoring the efficiency of each transmission path in multiple path transmission systems, and for redistributing the power among the more efficient paths so as to increase overall system effectiveness.

A further object is to provide a phased array system for transmitting electromagnetic energy which separately monitors the efficiency of the various transmission paths and adaptively controls the relatively gain of the channels to increase the overall power transmission efficiency.

Still another object is to provide multiple path power transmission systems which measure the transmission efficiency of each path without interrupting the power distribution operation and without the requirement for auxiliary signal transmission over the power transmission links.

In accordance with the subject invention, each transmission path of a multiple path transmission system is separately monitored by employing a separate label or tag for each of the power signals. In one preferred embodiment particularly adapted to electromagnetic phased arrays, a characteristic phase modulation for each path, for example, a separate distinct phase modulating frequency, is applied to each of the transmitting beams. The relative level of amplitude modulation components at twice the characteristic phase modulating frequencies, in the received signal, is indicative of the relative efficiency of associated paths. These modulation components are processed to develop weighting function control signals which individually control the gain of power amplifiers in each of the transmitting channels to optimize the power received from the target.

Hence, the subject invention efficiently solves the problem of monitoring and correcting for all types of failures, total or partial, in multiple path power transmission systems.

BRIEF DESCRIPTION OF THE DRAWINGS

The novel features of this invention, as well as the invention itself, will be better understood from the accompanying description taken in connection with the accompanying drawings in which like reference characters refer to like parts and in which:

FIG. 3 depicts waveforms of timing signals for explaining the operation of the power control units of FIG. 1;

FIG. 4 is a diagram of the composite electromagnetic fields at a target, for explaining the phase to amplitude conversion process utilized by the adaptive power redistribution systems of the subject invention.

DESCRIPTION OF THE PREFERRED EMBODIMENTS

Figure 1:
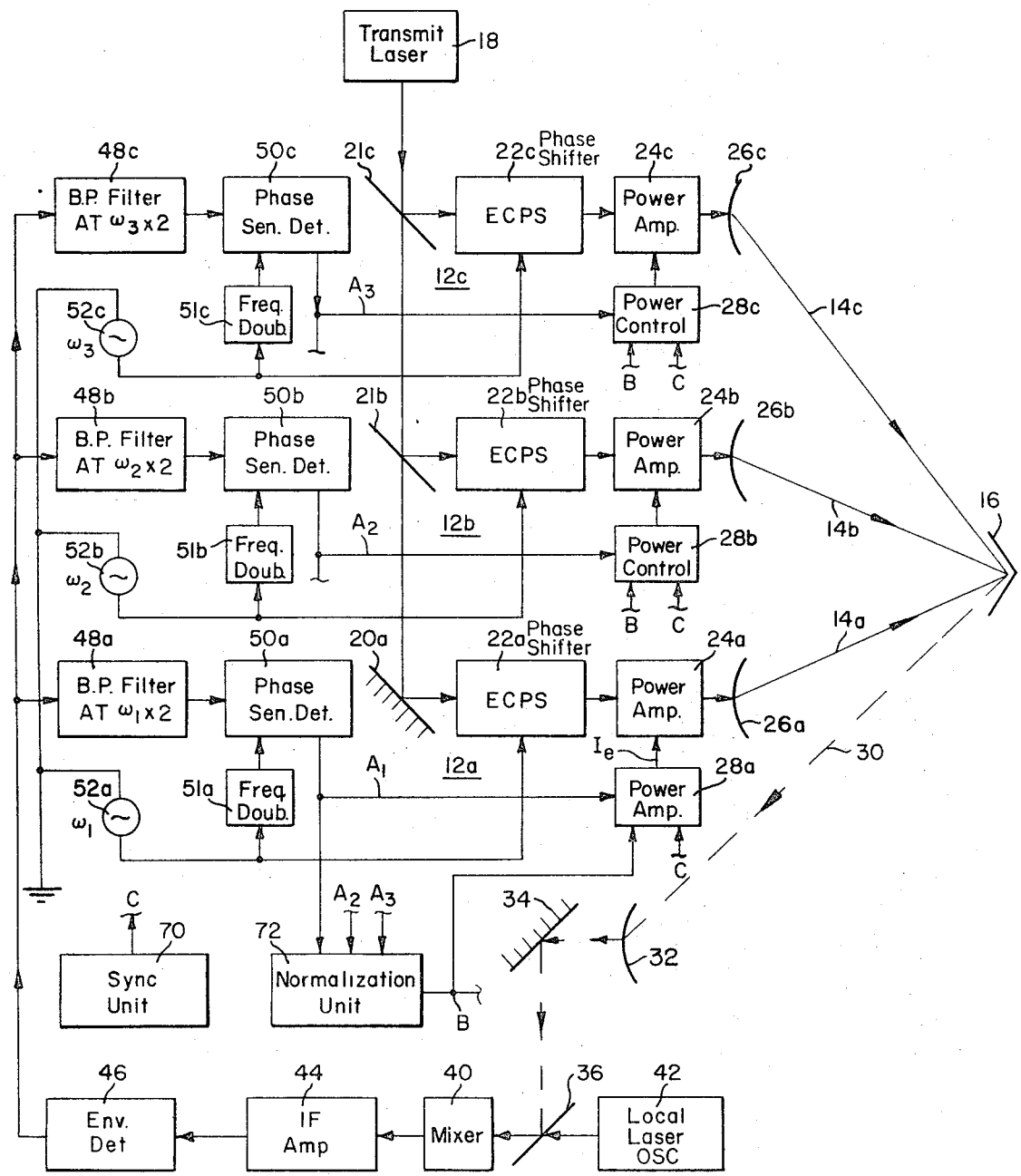
FIG. 1 is a block diagram of an optical array transmitting system which separately monitors the efficiency of the power transmission in each path and adaptively controls the relative gain of the channels to increase the overall system effectiveness.

As shown in FIG. 1, a plurality of transmitting channels, indicated generally by reference designations 12a, 12b and 12c, transmit electromagnetic energy in the form of beams 14a, 14b and 14c, respectively, to a target 16. Due to the similarity of these transmitting channels corresponding elements are assigned the same reference numeral with the letters a, b or c identifying the elements associated with channels 12a, 12b and 12c, respectively.

Considering first channel 12a, energy from a laser 18 is applied by means of a mirror 20a, an electronically controllable phase shifter 22a and a laser power amplifier 24a to a transmitting aperture 26a. Aperture 26a may include focusing optics such as telescopes; and power amplifier 24a may be the "electronically pumped" $CO_2$ type whose gain is controllable in response to a signal ($I_e$) applied thereto from a power control unit 28a.

In a similar manner apertures 26b and 26c excited by energy from laser 18 applied by beam splitters 21b and 21c; electronically controllable phase shifters 22b and 22c; and power amplifiers 24b and 24c, respectively.

A portion of the total energy reflected from target 16, shown as beam 30, is received by an aperture 32 and is applied by means of a mirror 34 and a beam splitter 36 to a photodiode mixer 40. This received energy is heterodyned in mixer 40 with an optical frequency signal supplied by a laser 42 and is amplified in an IF amplifier 44. The signal for amplifier 44 is processed by an envelope detector 46 which produces an output signal that varies in accordance with the envelope of the IF signal from amplifier 44.

The signal from detector 46 is applied to passband filters 48a, 48b, and 48c. Due to the similarity of the control loops associated with each of the transmitting channels, like elements are assigned like reference numerals followed by a letter a, b or c identifying the associated channel.

Still mainly considering channel 12a, filter 48a is centered at a frequency $2\omega_1$ and the output therefrom is applied as one input to a phase sensitive detector 50a. The signal from detector 50a has a magnitude $X \sin \phi$, where $X$ is a function of the magnitude of the signal applied from filter 48a and $\phi$ is the phase angle between the last mentioned signal and a signal at a frequency of $2\omega_1$ applied from a frequency doubler circuit 51a.

Frequency doubler circuit 51a is driven by the output signal from a reference oscillator 52a which provides an output signal at a frequency $\omega_1$. The output signal from reference oscillator 52a is also applied to electronically controllable phase shifter unit 22a. Phase shifter 22a which may be a movable mirror or an electro-optical device, for example, varies the effective transmission path length (a net phase shift) in response to, and at the frequency of the signal applied thereto from reference oscillator 52a.

In a similar manner phase modulation is applied to beams 14b and 14c at modulating frequencies $\omega_2$ and $\omega_3$, respectively.

The operation of the efficiency monitoring portion of the subject invention may be better understood by reference to the waveforms of FIG. 4. Curve 56 represents the phase distribution of the electromagnetic fields of the ensemble of radiated beams in the vicinity of target 16. For the moment it is assumed that the mean phase of the fields of each of the beams, at the target, is at or near the peak 57 of the phase envelope 56. Means for maintaining the phase of the fields of all the beams at this peak will be explained hereinafter with reference to FIG. 5. In FIG. 4, the phase modulation at frequency $\omega_1$, caused by phase shifter 22a, is depicted by a waveform 59. This phase modulation produces an amplitude modulation shown by a waveform 61, about the peak of the envelope 56. Since the phase modulation is about the peak of the envelope the resulting amplitude modulation (shown by waveform 61) contains very little energy at the modulating frequency $\omega_1$, but has substantial energy at the second harmonic of this frequency ($2\omega_1$). By way of contrast, it may be seen that if the phase modulation occurred on the right skirt of the envelope 56 the resulting amplitude modulation (curve 58) would be comprised of energy substantially at the fundamental modulating frequency. Similarly if the phase modulation were to the left of phase peak, such as shown by waveform 60, the resulting amplitude modulation would again be primarily at the fundamental frequency. The above analysis may be extended to each of the beams of the transmitting array, and where a significant number of such beams are used in a transmission system it may be shown that the relative magnitude of the energy, at the second harmonic of each modulating frequency, is an indication of the portion of the total received power due to the associated beam.

The output signal $A_1$ from phase sensitive detector 50a (FIG. 1) is a function of the magnitude of the received amplitude modulation signal components at the frequency $2 \times \omega_1$, and hence of the relative received power due to transmitting beam 14a. Similarly, signals $A_2$ and $A_3$ from phase detectors 50b and 50c, respectively, are indicative of the relative transmission efficiency of beams 14b and 14c.

With the above described signal, indicative of the separate propagation path efficiencies ($A_m$), the power may be redistributed among the various transmitting channels according to any desired scheme. By way of example, for the optical transmitting array shown in FIG. 1 it may not be desirable to transfer the total system power into the single channel associated with the most efficient propagating path for several reasons. First, it is unlikely that in most systems a single transmission channel can accommodate N times its nominal design power — where N is the number of transmitting channels. Second, for targets which are small compared to the beam width of a single element of the array, as more power is distributed to fewer and fewer elements the radiation pattern of the total array broadens and the effective power density on the target diminishes. Consequently, for an application involving the transmission of electromagnetic power from phased arrays, the optimum redistribution policy involves a compromise between a uniform excitation of the array elements, which tends to preserve narrow beams, and a drastically nonuniform distribution which tends to concentrate the radiated power in the more efficient paths.

Using the above considerations, and assuming that all transmitting beams are on target and accurately cophased, the amplitude weighting function $W_m$ for the radiating source aperture field associated with aperture m may be computed as outlined by the following equations. The power on a point target is proportional to $$P_{\text{tar}} = K_1 \left[ \sum_{m=1}^{N} W_m A_m(t) \right]^2 \quad (1)$$

To maximize the power subject to the constraint of a constant radiated power $$P_{\text{rad}} = K_2 \sum_{m=1}^{N} W_m^2 = cnst \quad (2)$$

The optimum values of $W_m$, $(W_m)_{opt}$ may be shown to be $$(W_m)_{opt} = [A_m N^{-1/2}]/[(\Sigma A_m^2)^{1/2}] \quad (3)$$

Hence for the above state conditions, the optimum field weighting factors are proportional to the path efficiencies, $A_m$. It is noted that the subject invention is applicable to any redistribution scheme and that a mechanization corresponding to Equation (3) is illustrated herein by way of an example of one preferred embodiment.

The weighting functions for the various transmission channels are mechanized by the power control unit 28 of each channel, which units are synchronized by timing (clock) pulses C from synchronization unit 70 (FIG. 1); and which utilizes "normalization signals" B applied from unit 72. Power control units 28 vary the excitation current to the associated power amplifiers 24 such that the gain of each of the respective channels is maintained in accordance with the corresponding weighting factor $W_m$.

Figure 2:
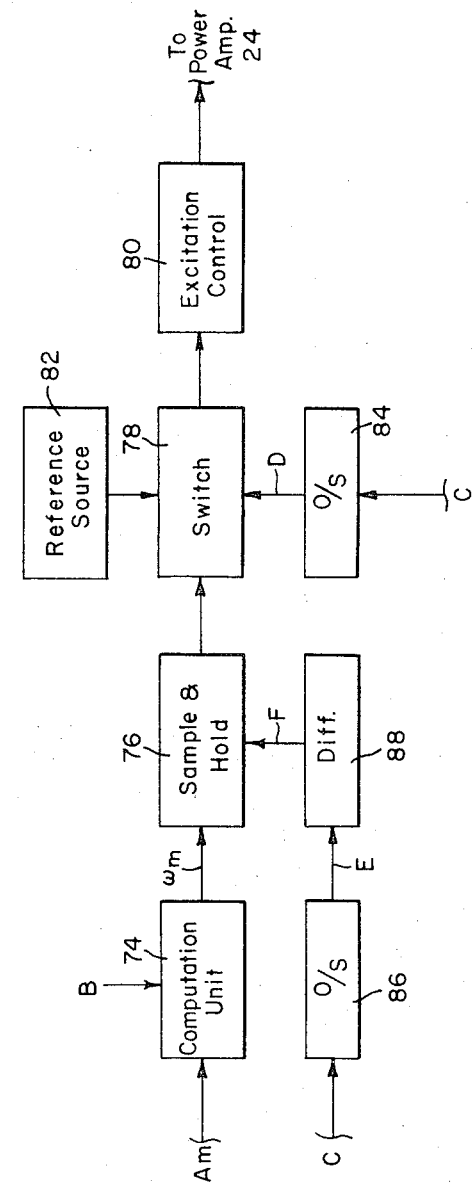
FIG. 2 is a block diagram of one embodiment of a power control unit which may be utilized in the system of FIG. 1.

One embodiment of unit 28 is shown in greater detail in FIG. 2 as comprising a computation unit 74, which may be any suitable computation circuit which can mechanize Equation (3) to provide the signal $W_m$. The term $A_m$ is applied to unit 74 from the phase sensitive detector 50 of the corresponding channel; and the term B which equals $$\left(\sum_{m=1}^{N} A_m^2\right)^{1/2}$$

from normalization unit 72. Unit 72 may be any suitable computing circuit which can form the term $$\left(\sum_{m=1}^{N} A_m^2\right)^{1/2}$$

from the signals $A_m$ applied thereto from the phase detectors of each of the channels.

The optimum weighting signal, $W_m$, formed by computation unit 74 is sampled by a sample and hold circuit 76 during the occurrence of sample pulses F (FIG. 3) at the end of each one of a plurality of repetitive computation periods. During control periods, which occur between the calibration periods, the samples value of $W_m$ is coupled through a switch 78 to an excitation unit 80, which in response to the signal $W_m$ applies a current $I_e$ to control the gain of the associated power amplifier 24. During the calibration periods a reference source 82 is coupled by means of the switch 78 to excitation control unit 80. The reference source signal is the same in all channels so that all power amplifiers have approximately the same gain during the calibration periods — thus allowing a meaningful comparison of their relative contributions to the received energy.

Switch 78 is controlled by a signal D (see waveform D of FIG. 3) applied from a monostable multivibrator (O/S) 84. Unit 84 is triggered by the timing pulses C from synchronization unit 70 (FIG. 1). Timing pulses C are also applied to a monostable multivibrator 86 which provides output pulses E (FIG. 3) which are of a slightly shorter time duration than the pulses D from unit 84. The output signals from unit 86 are differentiated by differentiator 88 and pulses in coincidence with the trailing edges of pulses E are applied as control signals F to sample and hold circuits 76.

Referring now primarily to FIGS. 2 and 3, the calibration periods are defined by the "on pulse time" of waveform D. The signals D control switch 78 such that during the "on pulse time" the reference source 82 is coupled to excitation control unit 80. Also during the "on pulse time" of signals D the value of $W_m$ is being computed in computation unit 74. Shortly before the end of the calibration period pulse E produced by unit 86 terminates, thereby initiating pulse F. Pulse F gates sample and hold unit 76 which then samples the value of $W_m$. Upon the termination of pulse D the stored value of $W_m$ is applied through switch 78 to control unit 80 such that the correct relative gain value is applied to each of the associated transmission channels. It should be noted that the timing shown in the waveforms of FIG. 3 is depicted for the purposes of explanation and that in practice the control periods between calibration pulses may greatly exceed those shown.

In the above explanation, it was assumed that the electromagnetic fields of each of the plurality of transmitted beams were substantially in phase at the target so that the phase modulation of each beam takes place about the peak 57 of the phase envelope 56 (FIG. 4). It is the phase modulation about the peak of the composite fields of the ensemble of beams which produces amplitude modulation components having a high second harmonic content (waveform 61 of FIG. 4). For some applications such as those involving optical arrays, the cophase condition at the target may be difficult to maintain without adaptive control of the mean phase of the transmitted beams, due to such things as atmospheric turbulence, for example. Systems for adaptive phase control which may be incorporated into the subject invention are described in detail in a copending application by the same inventor, entitled "Adaptive Arrays," filed the same date as the subject application.

Figure 5:
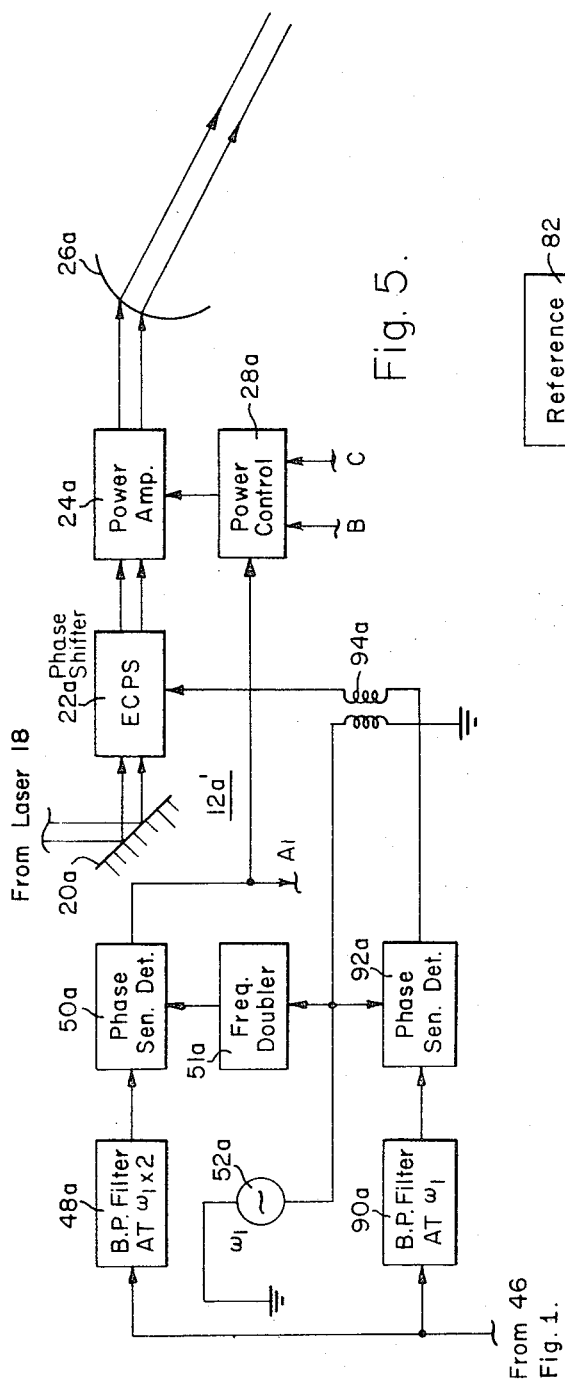
FIG. 5 is a block diagram of one transmission channel of the system of FIG. 1 with additional circuitry for adaptively controlling the phase of the transmitted beams to establish a cophase condition at the target.

FIG. 5 shows one channel 12a' of the system of FIG. 1 modified for adaptive control of the phase of the transmitted electromagnetic fields in accordance with the teachings of the above referenced application. It is understood that adaptive phase control, when desired, would be applied to all transmitting channels of the system. Referring now primarily to FIG. 5, the modulation components in the received signal are applied from envelope detector 46 (FIG. 1) to a bandpass filter 90a centered at frequency $\omega_1$. The output signal from filter 90a is applied to a phase sensitive detector 92a wherein it is phase detected against a reference signal at the frequency $\omega_1$ supplied from reference oscillator 52a. The signal from phase detector 92a is summed with the reference signal $\omega_1$ by means of a transformer device 94a; and this summed signal is applied to an electronically controllable phase shifter 22a.

For the general case of transmitting channel $m$, the modulation applied to the transmitted beam by the associated electronically controllable phase shifter 22 produces a phase excursion, $$\psi_{ps}(t) = -\beta_c + \beta_m \sin \omega_m t \quad (4)$$

where $\beta_c$ is a corrective (unmodulated) phase shift applied from phase sensitive detector 92 to provide the desired phase adjustment for maintaining the transmitted electromagnetic fields substantially in phase at the target. The net phase shift error $\beta_o$ at the target 16 is also dithered over this same range; that is, $$\beta_o = \beta_a - \beta_c + \beta_m \sin \omega_m(t) \qquad (5)$$

where $\beta_a$ is the atmospheric (or other) phase error to be corrected by $\beta_c$.

As shown in FIG. 4, for a phase error $\beta_1$ to the right of the peak of phase envelope 56, the resulting modulation envelope 58 is in phase with the dither source (reference oscillator 52). For a phase error $\beta_2$ to the left of the peak of the phase envelope, the modulation envelope 60 is 180° out of phase. For $\beta_a = \beta_c$, the fundamental component of the modulation envelope vanishes as illustrated by waveform 61 of FIG. 4 and the resultant modulation components have a high second harmonic content. As explained above it is the second harmonic signals which are utilized to sense the relative transmission efficiencies of the various channels, and modulation signals at the fundamental frequencies are used to maintain the "in phase" condition.

The system of FIG. 5 has the required characteristics for a feedback control network whereby the mean value of the phase shift introduced by phase shifter 22, $\beta_c$, is controlled such that $\beta_a - \beta_c$ is driven to zero, thereby maintaining a cophase condition at target 16. In particular it is noted that the magnitude and polarity of the output signal of phase detector 92 is such as to force the mean phase value of the associated transmitted beam to be substantially in phase, at the target, with the ensemble of electromagnetic fields comprising the plurality of other beams.

Again referring primarily to the embodiment of FIG. 1, it is noted that although phase sensitive detectors 50 were utilized therein for improved detection of low signal-to-noise ratio components, that in some applications this quality of detection may not be required. In these cases the output signal from bandpass filters 48 may be applied directly to the associated power control units 28.

In the disclosed embodiments heterodyne detection (mixer 40) was utilized because in general its performance is superior to video detection without prior IF amplification. However, the subject invention is equally well adapted to other detection techniques.

Further, it is noted that although the subject invention is illustrated herein with targets reflecting the transmitted energy to a receiver system, the invention is just as applicable to applications where the power is transmitted by means of multiple parallel paths directly to a remotely located receiving station.

To summarize the operation of the subject invention, the efficiency of the power transmission in each path of multiple path systems is monitored and the gain of each transmission channel is controlled as a function of the relative path efficiencies to redistribute the power among the various channels so as to maximize overall system performance. Each transmitted beam is separately labeled or tagged by a characteristic phase modulation at a frequency $\omega_m$. The phase modulation impressed on each of the transmitted beams interacts with the ensemble of electromagnetic fields of all of the beams to produce amplitude modulation components in the received signal. The relative level of these amplitude modulation components at twice the characteristic phase modulating frequency ($2\omega_m$) is indicative of the relative efficiency of the associated path (path $m$). The modulation components are processed to provide weighting function control signals which individually control the gain of amplifiers in each of the transmitting channels to optimize transmission efficiency. The monitoring and control functions are timed shared such that during the monitoring or computation periods all channels are set to approximately the same gain value. In this manner the relative efficiencies are directly related to the magnitude of the received modulation components. The computed weighting function signals formed during the computation period are stored and used to control the gain of associated transmission channels.

Thus there has been described new and novel systems for separately monitoring the efficiency of each path of multiple path power transmission systems and for redistributing the power among the paths in such a manner as to maximize overall efficiency.

What is claimed is:

1. A device for monitoring the efficiency of power transmission in a multiple path system, said device comprising:

modulating means for phase modulating the energy in each of said multiple paths at a separate modulation frequency;

means for receiving a portion of the energy transmitted along said multiple paths; and processing means responsive to modulation components in said received energy, for providing a separate signal for each path indicative of the transmission efficiency of said path, said processing means including filter means responsive to amplitude modulation components at approximately the second harmonic of each modulating frequency, for providing said signals indicative of the transmission efficiency of said paths.

2. The device of claim 1 further comprising control means, responsive to said efficiency signals, for controlling said transmission system to cause relatively more power to be applied to the more efficient paths.

3. The device of claim 1 wherein said system has a power amplifier associated with each path; and said device further comprises control means responsive to said efficiency signals, for controlling the gain of said amplifiers as a function of said efficiency signals.

4. The device of claim 1 wherein said system includes a plurality of transmitting channels for radiating electromagnetic energy along said paths; and said modulating means includes different electronically controllable phase shifters coupled in each of said transmission channels, and means for varying the phase of each of said phase shifters at a different one of said separate modulating frequencies.

5. The device of claim 1 wherein said filter means includes a separate bandpass filter associated with each of said paths, each said filter being approximately centered at the second harmonic of the modulating frequency for the associated path.

6. The device of claim 1 wherein said system includes a plurality of transmitting channels for radiating electromagnetic energy along said multiple paths, and said device further comprises phase control means responsive to the modulation components in said received energy, for controlling the relative phase of the electromagnetic fields in each path to cause corresponding fields in all paths to be substantially in phase.

7. The device of claim 6 wherein said processing means further comprises second filter means responsive to amplitude modulation components at approximately each modulating frequency for controlling the mean phase of associated paths as a function thereof.

8. A device for controlling the power distribution in a multiple path transmission system, said device comprising:

modulating means for applying distinctive modulation to the energy transmitted along each of the multiple paths;
   means for receiving a portion of the energy transmitted along said multiple paths;
   processing means responsive to modulation components in said received energy, for providing a separate signal for each path indicative of the transmission efficiency of said path; and
   control means, responsive to said efficiency signals, for controlling said transmission system to cause relatively more power to be applied to the more efficient paths.

9. The device of claim 8 wherein said system has a power amplifier associated with each path; and said control means includes means for controlling the gain of these amplifiers as a function of said efficiency signals.

10. The device of claim 9 further comprising means for causing the gain of the amplifiers associated with said paths to be substantially equal during calibration time periods; means for storing the value of said efficiency signals formed during said calibration periods; and means for controlling the gain of said amplifiers during other periods as a function of said stored signals.

11. A device for controlling the power distribution in a multiple path transmission system, said device comprising:

means for modulating the energy transmitted in each of said multiple paths;
   means for receiving a portion of the composite energy transmitted along said multiple paths;
   processing means responsive to modulation components in said received energy, for providing signals indicative of the transmission efficiency of each path; and
   control means responsive to said signals, for controlling said transmission system to cause relatively more power to be applied to the more efficient paths.

12. The device of claim 11 wherein said means for modulating includes means for phase modulating the energy in each path at a different modulation frequency; and said processing means includes filter means responsive to amplitude modulation components at approximately the second harmonic of each modulating frequency, for providing said signals indicative of the transmission efficiency of each path.

13. The device of claim 11 wherein said system includes a different power amplifier in each path; and said control means includes means for controlling the gain of these amplifiers as a function of said efficiency signals.

14. The device of claim 13 further comprising means for causing the gain of said amplifiers to be substantially equal during periodic calibration periods, means for storing the value of said efficiency signals during said calibration periods, and means for controlling the gain of said amplifiers during other periods as a function of said stored signals.

15. The device of claim 11 wherein said system includes a plurality of transmitting channels for radiating electromagnetic energy along said multiple paths; and said modulating means includes different electronically controllable phase shifters coupled in each of the transmission channels, and means for controlling said phase shifters to cause the modulation of the transmitted energy.

16. The device of claim 12 wherein said filter means includes a separate bandpass filter associated with each of said paths, each said filter being approximately centered at the second harmonic of the modulating frequency of an associated path.

17. The device of claim 12 wherein said system includes different transmitting channels for radiating electromagnetic energy along each of said multiple paths; and said device further comprises phase control means responsive to the modulation components in said received energy at approximately the modulating frequencies, for controlling the relative phase of the electromagnetic fields in each path to cause corresponding fields in all paths to be substantially in phase.

18. A device for monitoring the efficiency of power transmission in a system having a plurality of transmitting channels for radiating electromagnetic energy along multiple paths, said device comprising:

modulating means for applying distinctive modulation to the energy transmitted along each of said multiple paths;
   means for receiving a portion of the energy transmitted along said multiple paths;
   phase control means responsive to modulation components in said received energy, for controlling the relative phase of the electromagnetic fields in each path to cause corresponding fields in all paths to be substantially in phase; and
   processing means responsive to modulation components in said received energy, for providing a separate signal for each path indicative of the transmission efficiency of said path.

19. The method of monitoring the efficiency of power transmission in a multiple path system comprising the steps of:

phase modulating the energy transmitted along each of said multiple paths at a distinct modulating frequency;
   receiving a portion of the energy transmitted along said multiple paths; and
   processing modulation components in said received energy to provide a separate signal for each path which is indicative of the transmission efficiency of said path, with said processing including filtering the received energy to provide said efficiency signals as a function of amplitude modulation components in said received energy at approximately the second harmonic of said modulating frequencies.

20. The method of controlling the power distribution in a multiple path transmission system comprising the steps of:

modulating the energy transmitted along each of said multiple paths;

receiving a portion of the energy transmitted along said multiple paths;

processing modulation components in said received energy to provide a separate signal for each path which is indicative of the transmission efficiency of said path; and controlling said transmission system as a function of said efficiency signals to cause relatively more power to be applied to the more efficient paths.

21. The method of claim 20 further comprising the steps of: adjusting the transmitting gain of each of the paths to be substantially equal during calibration time periods; storing the value of said efficiency signals formed during said calibration periods; and controlling the relative transmitting gain of each said path during other periods as a function of said stored signals.

* * * * *